May 12, 1959 H. TÖPFER 2,886,644
CIRCUIT ARRANGEMENT FOR PARTY-LINE SELECTION
IN TELEPHONE SYSTEMS OR THE LIKE
Filed April 21, 1955
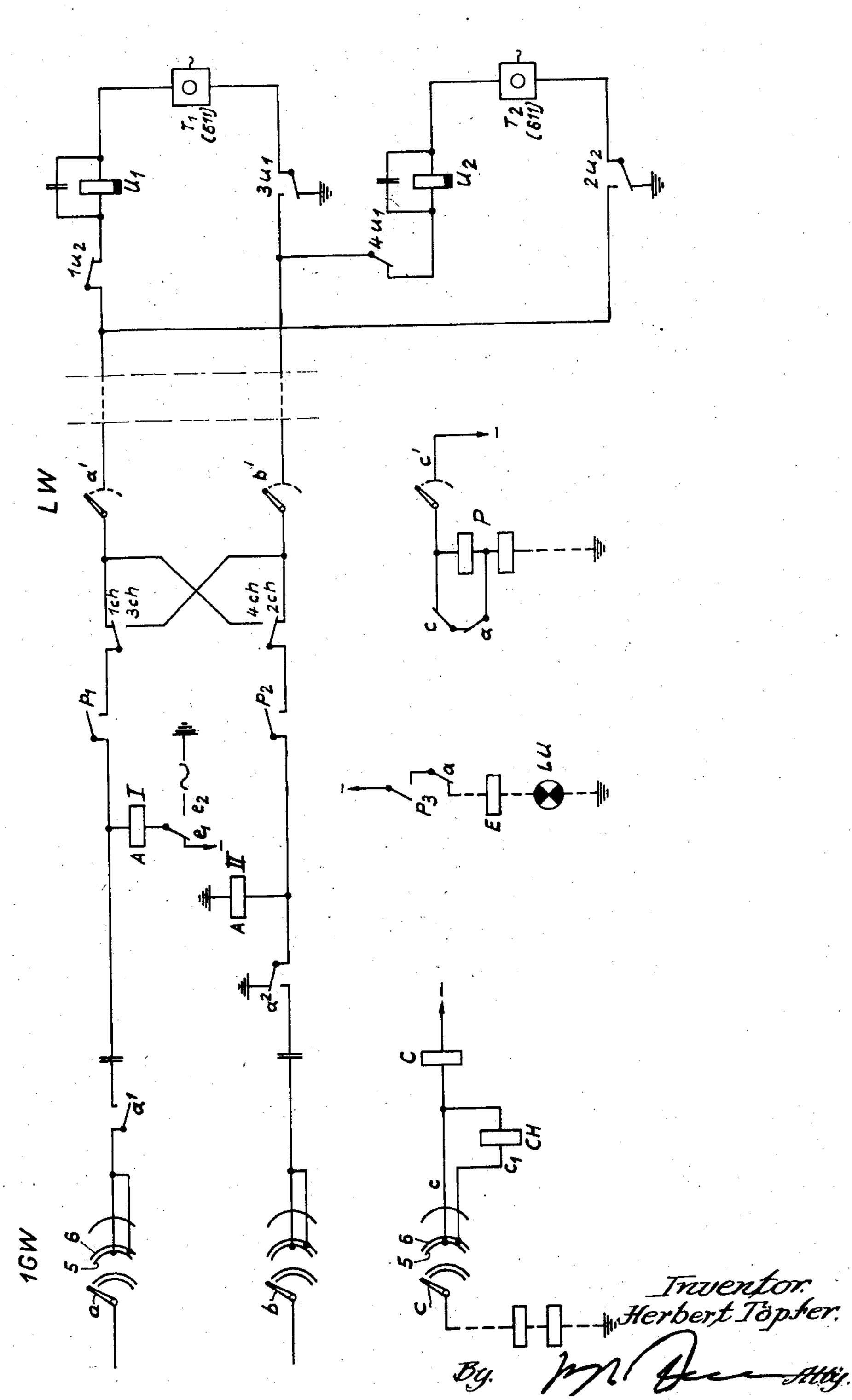
Inventor:
Herbert Töpfer
By [signature] Atty.

United States Patent Office 2,886,644

Patented May 12, 1959

2,886,644

CIRCUIT ARRANGEMENT FOR PARTY-LINE SELECTION IN TELEPHONE SYSTEMS OR THE LIKE

Herbert Töpfer, Munich, Germany, assignor to Siemens & Halske Aktiengesellschaft, Munich, Germany, a corporation of Germany Application April 21, 1955, Serial No. 502,783
In Germany October 25, 1949

Public Law 619, August 23, 1954
Patent expires October 25, 1969

4 Claims. (Cl. 179—17)

This invention is concerned with party-line selection in telephone systems.

It is known in party-line operation, especially in two-station line operation, to select the corresponding subscribers over two different outlets of the connector without transmission of an auxiliary party digit. The differentiating identification of the two subscribers is effected by reversing the line conductors in one of the connector outlets. Due to the reversal of line conductors, one of the subscribers can be reached in incoming traffic over one line conductor and the other over the other line conductor, and outgoing calls can be established correspondingly.

The disadvantage of the above described arrangement is that it requires for each line common to the two parties two outlets in the connector, thus limiting the capacity of the corresponding exchange. In order to avoid such limitation, another known arrangement ("Advance in the Telephone Technique"; Siemens & Halske, June 1933, "Two Party Lines" by E. Jauch) effects the reversal of the line conductors within the connector circuit instead of at the connector outlets, thereby requiring only one outlet for the line common to the two parties instead of two outlets as before.

This latter arrangement requires after the setting of the connector responsive to the tens and units digits transmission of further party digits for respectively identifying the two parties on the common line having crossed line conductors. The processing of the party digits entails considerable additional expediture of switching means in the connector.

In order to avoid this expenditure, the invention provides a plurality of paths over which a connector can be seized and effects the differential identification of the subscribers on a common party line over one or the other line conductor depending upon the path over which the connector has been seized.

The new arrangement is particularly advantageous in case the group selector stage preceding the connector is not fully utilized thus providing unoccupied decades or levels for trunks leading to the connectors.

An example of the invention will now be described with reference to the accompanying drawing.

The invention, as shown in the drawing, is applied to the selection of subscribers on a two-station line. It will be understood, however, that the invention is also applicable in other circumstances presenting conditions similar to two-station line switching. For example, the invention may be applied in the case of a subexchange comprising a plurality of groups of subscribers and being connected, for example, with a main exchange over one or more trunks. A discrimination or identification of the respective subscriber groups can in such case be effected by controlling the switches of the respective subscriber groups by impulse series transmitted over one or the other line conductor of the trunks taken into use, in a similar manner as the connector is controlled in the two-station line selection or switching according to the invention.

The drawing shows only circuit details which are indispensable for the understanding of the invention.

It is assumed that there are two subscribers $T_1$ and $T_2$ on the party line and that these subscribers have respectively the numbers 511 and 611. When a call is to be extended to the subscriber $T_1$, the first group selector 1GW will receive the first impulse series corresponding to the first digit "5" transmitted from the calling station, and such group selector will accordingly in known manner lift its wipers *a*—*b*—*c* to the fifth decade or level of its bank contacts and will thereafter rotate the wipers to hunt for a trunk leading to an idle connector. Upon finding such trunk which is assumed to lead to the connector LW, the seizure relay C of such connector will energize and will in known manner prepare the connector for operation. The next following impulse series corresponding to the digits "1" and "1" will actuate the connector so as to lift its wipers *a'*—*b'*—*c'* to the first decade or level and thereafter rotate them within such level to the first bank contacts associated with the called line.

If the selected called party line $T_1$ is idle, the test relay P of the connector will energize. At contacts *p*1 and *p*2, the relay P will extend the line conductors to the called station and at contact *p*3, a circuit will be closed for energizing the ring control relay E over the ringing interrupter LU. The ring control relay E will accordingly intermittently energize to connect at its contact *e*2 ringing current to the upper line conductor of the connector, thus transmitting ringing current to the called subscriber $T_1$ from +, ringing current source, *e*2, AI, *p*1, 1*ch*, wiper *a'* of the connector, 1*u*2, $U_1$, station $T_1$, 3*u*1 to +, thereby actuating the corresponding ringer.

When the called subscriber $T_1$ answers, by lifting the receiver, a circuit will be closed in a ringing interval when E is deenergized, from ground on contact 3*u*1, over the switch hook contacts at $T_1$, $U_1$, 1*u*2, wiper *a'*, *p*1, AI, *e*1 to battery, causing relay $U_1$ at the called station and also the battery feed relay A to operate. Relay $U_1$ switches the lower line conductor through at the subscriber station, thereby completing the loop circuit over the lower line conductor and wiper *b'*, contact *p*2 to the other winding II of the battery feed relay A. At contact 4*u*1, the relay $U_1$ disconnects the other party $T_2$. The battery feed relay A, upon energizing, opens its contact *a* to disconnect the ring control relay E causing restoration thereof, relay E disconnecting the ringing source. At contacts *a*1 and *a*2, relay A switches the line conductors through to the calling party.

In case a call is to be extended to the party line subscriber $T_2$, the group selector 1GW responsive to the first impulse series corresponding to digit "6" will lift its wipers *a*—*b*—*c* to the sixth decade or level and will thereupon rotate the wipers in such level to hunt for a trunk leading to an idle connector, which is again assumed to be the connector LW. As shown in the drawing, the trunk conductors extending from the sixth level of the group selector 1GW to the connector are interconnected with the corresponding trunk conductors extending from the fifth level. In the circuit of the test or private conductor *c*1 of the connector, which is reached over the sixth level of the group selector, is disposed a control relay CH which is in series with the seizure relay C and both these relays are accordingly energized when the connector LW is seized by the group selector responsive to the digit "6." Relay C prepares the connector for operation as before. Relay CH, upon energizing, reverses the two line conductors of the connector extending respectively to the wipers *a'* and *b'* by opening its contacts 1*ch* and 2*ch* and closing contacts 3*ch* and 4*ch*. When ringing current is placed on the upper line conductor of the connector, after it has selected the called line as described before, and assuming such line to be idle and relay P accordingly energized while relay E is intermittently operated, such ringing current will be transmitted to the called party $T_2$ over the lower line conductor from +, ringing current source, AI, *p*1, 3*ch*, wiper *b'* of the connector, 4*u*1, $U_2$, station $T_2$, 2*u*2 to +, to actuate the ringer at the called station.

When the called party answers by lifting the receiver, a circuit will be closed in a ringing interval, from ground at 2*u*2, switch hook at $T_2$, $U_2$, 4*u*1, wiper *b'*, 3*ch*, *p*1, AI to battery. Relays $U_2$ and A energize in this circuit. Relay $U_2$ closes at 2*u*2 a point in the loop circuit and disconnects the party $T_1$ at contact 1*u*2. Relay A disconnects relay E and the ringing interrupter LU and switches the line conductors through to the calling party, thereby completing the connection as described before.

The operations affecting the release of the call are generally known, form no part of the invention, and a description thereof has accordingly been omitted.

Changes may be made within the scope and spirit of the appended claims.

I claim:

1. In a telephone system, a connector having access to a two-station party line, a group selector, a trunk extending from said group selector to said connector, said trunk having branches respectively accessible to said group selector responsive to receipt of different impulse series denoting different digits respectively identifying the two stations on said party line, circuit means in said connector effective when said connector has been seized by said group selector over one branch of said trunk for transmitting ringing current to said party line, upon seizure thereof, over one of the line conductors extending thereto, to ring one of the stations on said party line, and control means actuated responsive to seizure of said connector by said group selector over another branch of said trunk for causing said circuit means to transmit ringing current to said party line over the other one of the line conductors extending thereto, to ring the other one of the stations on said party line.

2. In a telephone system, a connector, a two-station party line accessible to said connector, a group selector, trunk lines branching respectively from predetermined first and second levels of said group selector and terminating in said connector, means for interconnecting the respective conductors of said trunk lines, a seizure relay disposed in a conductor of one of the trunk lines branching from said first level of said group selector, a control relay disposed in a conductor of another trunk line branching from said predetermined second level of said group selector, said seizure relay being energized jointly with said control relay when said connector is seized by said group selector over said trunk line branching from said predetermined second level thereof, and contact means actuated by said control relay for reversing the line conductors of said connector as a criterion for identifying the party line station to which a call is to be extended over said predetermined second level of said group selector.

3. The system and cooperation of elements as specified in claim 2, comprising means for connecting ringing current in said connector to one predetermined line conductor thereof for transmission over the identical line conductor to one of said party lines when a call is extended thereto over said predetermined first level of said group selector, said control relay reversing said line conductors in said connector for transmitting said ringing current to the other party line when a call is extended thereto over said predetermined second level of said group selector.

4. The system and cooperation of elements as specified in claim 3, comprising means at each party line station responsive to extending of a call thereto for disconnecting the other station.

References Cited in the file of this patent

UNITED STATES PATENTS

| | | |
|---|---|---|
| 2,583,782 | Lomax | Jan. 29, 1952 |
| 2,659,770 | Elliott | Nov. 17, 1953 |
| 2,788,394 | Barrow | Apr. 9, 1957 |